(12) United States Patent
Horihata et al.

(10) Patent No.: US 11,367,417 B2
(45) Date of Patent: Jun. 21, 2022

(54) DISPLAY CONTROL DEVICE AND NON-TRANSITORY TANGIBLE COMPUTER-READABLE MEDIUM THEREFOR

(71) Applicant: DENSO CORPORATION, Kariya (JP)

(72) Inventors: Satoshi Horihata, Kariya (JP); Yasushi Sakuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/092,586

(22) Filed: Nov. 9, 2020

(65) Prior Publication Data

US 2021/0056934 A1 Feb. 25, 2021

Related U.S. Application Data

(63) Continuation of application No. PCT/JP2019/017326, filed on Apr. 24, 2019.

(30) Foreign Application Priority Data

May 29, 2018 (JP) .............................. JP2018-102455

(51) Int. Cl.
*G09G 5/37* (2006.01)
*B60K 35/00* (2006.01)

(52) U.S. Cl.
CPC ............... *G09G 5/37* (2013.01); *B60K 35/00* (2013.01); *B60K 2370/1529* (2019.05); *B60K 2370/166* (2019.05); *B60K 2370/167* (2019.05); *B60K 2370/175* (2019.05); *B60K 2370/177* (2019.05); *B60K 2370/178* (2019.05); *B60K 2370/52* (2019.05); *G09G 2380/10* (2013.01)

(58) Field of Classification Search
CPC ...... G09G 5/37; G09G 2380/10; B60K 35/00; B60K 2370/1529; B60K 2370/167; B60K 2370/177; B60K 2370/175; B60K 2370/166; B60K 2370/178; B60K 2370/52
USPC ......................................................... 345/633
See application file for complete search history.

(56) References Cited

U.S. PATENT DOCUMENTS

| | | | |
|---|---|---|---|
| 2014/0364212 A1* | 12/2014 | Osman | G06F 3/013 463/31 |
| 2015/0291160 A1* | 10/2015 | Kim | B60W 30/16 345/633 |
| 2018/0004286 A1* | 1/2018 | Chen | G06F 3/012 |
| 2018/0090007 A1* | 3/2018 | Takemori | G01S 13/931 |
| 2018/0211414 A1* | 7/2018 | Cronin | B60W 40/02 |
| 2018/0224932 A1* | 8/2018 | Von Novak | G06T 11/60 |

(Continued)

FOREIGN PATENT DOCUMENTS

| | | |
|---|---|---|
| JP | H0367730 A | 3/1991 |
| JP | H10100739 A | 4/1998 |

(Continued)

*Primary Examiner* — Jin Ge
(74) *Attorney, Agent, or Firm* — Harness, Dickey & Pierce, P.L.C.

(57) ABSTRACT

A display control device for a vehicle to control a display of a virtual image to be superimposed on a superimposition target in a foreground of an occupant includes: a condition determination unit that determines whether a predetermined interruption condition is satisfied; and a display control unit that interrupts the display of the virtual image when the condition determination unit determines that the interruption condition is satisfied.

9 Claims, 8 Drawing Sheets

(56) References Cited

U.S. PATENT DOCUMENTS

| | | | | |
|---|---|---|---|---|
| 2018/0297611 A1* | 10/2018 | Fujisawa | ............... | G01C 21/365 |
| 2019/0333481 A1* | 10/2019 | Hato | ..................... | G09G 5/38 |
| 2019/0337454 A1* | 11/2019 | Takazawa | ............. | B60K 35/00 |
| 2020/0221057 A1* | 7/2020 | Shimoda | ................ | G09G 5/36 |

FOREIGN PATENT DOCUMENTS

| | | | |
|---|---|---|---|
| JP | 2005069799 A | 3/2005 |
| JP | 2005297810 A | 10/2005 |
| JP | 2009190520 A | 8/2009 |
| JP | 2014213763 A | 11/2014 |

\* cited by examiner

DISPLAY CONTROL DEVICE AND NON-TRANSITORY TANGIBLE COMPUTER-READABLE MEDIUM THEREFOR

CROSS REFERENCE TO RELATED APPLICATION

The present application is a continuation application of International Patent Application No. PCT/JP2019/017326 filed on Apr. 24, 2019, which designated the U.S. and claims the benefit of priority from Japanese Patent Application No. 2018-102455 filed on May 29, 2018. The entire disclosures of all of the above applications are incorporated herein by reference.

TECHNICAL FIELD

The present disclosure relates to relates to a display control device for controlling a display of a virtual image, and a non-transitory tangible computer-readable medium therefor.

BACKGROUND

Conventionally, for example, a vehicle navigation system displays an information transmitter used for presenting information such as route guidance as a virtual image in the foreground of an occupant by a head-up display. The head-up display can project the light which provides a virtual image in the wide range of a windshield of the vehicle. Therefore, in a situation where the information transmitter overlaps an obstacle such as a preceding vehicle, the information transmitter is displaced to a display position where it does not overlap the obstacle.

SUMMARY

A display control device for a vehicle to control a display of a virtual image to be superimposed on a superimposition target in a foreground of an occupant includes: a condition determination unit that determines whether a predetermined interruption condition is satisfied; and a display control unit that interrupts the display of the virtual image when the condition determination unit determines that the interruption condition is satisfied.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

When the display position of the virtual image is displaced to a position where it does not overlap the obstacle, for example, the information transmitter such as route guidance may be superimposed and displayed at a place different from the intersection at which the vehicle is scheduled to turn right or left. As described above, the virtual image display that is continued to be displayed even in a scene in which the image cannot be correctly superimposed may cause a misunderstanding of the occupant.

In view of the above point, a display control device, a display control program, and a non-transitory tangible computer-readable medium are provided to be capable of displaying a virtual image that is not easily misunderstood by an occupant.

In the first aspect of the present embodiments, a display control device for a vehicle to control a display of a virtual image to be superimposed on a superimposition target in a foreground of an occupant includes: a condition determination unit that determines whether a predetermined interruption condition is satisfied; and a display control unit that interrupts the display of the virtual image when the condition determination unit determines that the interruption condition is satisfied.

In the second aspect of the present embodiments, a display control program for a vehicle to control a display of a virtual image to be superimposed on a superimposition target in a foreground of an occupant is configured to cause at least one processor to function as a condition determination unit that determines whether a predetermined interruption condition is satisfied; and a display control unit that interrupts the display of the virtual image when the condition determination unit determines that the interruption condition is satisfied.

In a third aspect of the present embodiments, a non-transitory tangible computer readable medium includes instructions executed by a computer, and the instructions for a vehicle to control a display of a virtual image to be superimposed on a superimposition target in a foreground of an occupant includes: determining whether a predetermined interruption condition is satisfied; and interrupting the display of the virtual image when the condition determination unit determines that the interruption condition is satisfied.

In these modes, a scene in which the virtual image cannot be correctly superimposed on the superimposition target is set as the interruption condition. Therefore, according to the control for stopping to display the virtual image based on the determination that the interruption condition is satisfied, the virtual image display is interrupted in a scene where it is difficult to correctly superimpose the virtual image display. Therefore, it is possible to display a virtual image that is unlikely to mislead the occupant.

A display control device 100 according to an embodiment of the present disclosure configures a virtual image display system 10 used in a vehicle A together with a head up display (hereinafter referred to as "HUD") device 30 and the like. The virtual image display system 10 displays a virtual image Vi to be superimposed on a superimposition target object in the foreground view of an occupant (for example, a driver) of the vehicle A such as another vehicle, a pedestrian and a cyclist. The virtual image display system 10 presents various information related to the vehicle A to the driver by augmented reality (hereinafter, "AR") display using the virtual image Vi.

The display control device 100 can communicate with other in-vehicle components via the communication bus of the in-vehicle network. For example, a navigation information providing unit 21, an ADAS information providing unit 22, a vehicle information providing unit 26, a driver information providing unit 27, an in-vehicle device 40, etc. are directly or indirectly electrically connected to the communication bus.

The navigation information providing unit 21 is configured to include at least a navigation device mounted on the vehicle A, and has a map database and a GNSS (Global Navigation Satellite System) receiver. The map database stores a large amount of map data for route guidance by the navigation device. The GNSS receiver receives positioning signals transmitted from a plurality of satellites.

The navigation information providing unit 21 measures the current position of the vehicle A based on the positioning signals received by the GNSS receiver. The navigation information providing unit 21 sequentially outputs the GNSS reception information indicating the current position of the vehicle A and the reception status of the positioning signal to the communication bus, and provides it to the display control device 100. The GNSS reception information includes the number of satellites receiving the positioning signal, the signal level (i.e., the strength) of the positioning signal, the reliability of the position information based on a predetermined algorithm, and the like as information indicating the reception status of the positioning signal.

When the destination is set in the navigation device, the navigation information providing unit 21 provides the map data of the surroundings and traveling direction of the vehicle A read from the map database and the route information to the destination as the map route information to the display control device 100. In addition, when the vehicle A deviates from the route set in the navigation device and a route re-search (hereinafter, "reroute") is performed, the navigation information providing unit 21 provides reroute information indicating that the reroute is being performed and is completed to the display control device 100.

The ADAS information providing unit 22 is configured to include at least a locator 23, an external sensor 24, a driving support control system 25, and the like. The locator 23 generates high accuracy positioning information indicating the lane in which the vehicle A is traveling, using the composite positioning way in which the GNSS reception information provided from the navigation information providing unit 21 is combined with the measurement information such as information from the inertial sensor and the external sensor 24. The locator 23 provides the high-accuracy position information to the driving support control system 25, the display control device 100, and the like.

The external sensor 24 is configured to include a front camera, millimeter wave and quasi-millimeter wave radar, a lidar, a sonar, and the like. The external sensor 24 detects a stationary object and a moving object around the vehicle A, particularly within the front area of the vehicle A. The external sensor 24 provides the external sensing information indicating the detection result of the object to the locator 23, the driving support control system 25, and the display control device 100.

The driving support control system 25 uses the highly accurate position information from the locator 23 and the external sensing information from the external sensor 24 to assist the driving operation of the driver. The driving support control system 25 has a functional unit that realizes an automatic driving function such as ACC (Adaptive Cruise Control), LTC (lane trace control), and LKA (Lane Keeping Assist). In addition, the driving support control system 25 has a functional unit that realizes a collision avoidance function such as FCW (Forward collision warning) and AEB (Automatic emergency braking). The driving support control system 25 provides the driving support control information from each functional unit to the display control device 100.

The subject vehicle information providing unit 26 is configured to include a plurality of in-vehicle sensors that measure the state of the vehicle A. The vehicle information providing unit 26 provides information such as the shift position of the transmission of the vehicle A in addition to the current vehicle speed, acceleration, angular velocity, and vehicle attitude of the vehicle A as vehicle motion information to the display control device 100.

The driver information providing unit 27 is configured to include at least a driver status monitor (Driver Status Monitor, hereinafter, "DSM") mounted on the vehicle A, and has a near infrared light source, a near infrared camera, and an image analysis unit. The driver information providing unit 27 acquires information such as the eyepoint EP of the driver, the line-of-sight direction, and the degree of eye opening by analyzing the face image captured by the near-infrared camera. The driver information providing unit 27 provides the acquired sensing information of the driver to the display control device 100.

The in-vehicle device 40 is an electronic control unit mounted on the vehicle A, and is electrically connected to in-vehicle indicators such as a combination meter 41, a multi-information display (MID) 42, and a center information display (CID) 43. For example, on the display screen of the CID 43, map data, route information to the destination, and the like are displayed by the navigation device. The display screen of the CID 43 includes a touch panel that can be touch-operated by a driver or the like. The in-vehicle device 40 integrally controls information presentation to the driver in response to a control request to each in-vehicle display device. In addition, the in-vehicle device 40 outputs a control request for superimposing and displaying an image to the display control device 100 in a scene that requires information presentation by virtual image display.

The HUD device 30 is electrically connected to the display control device 100, and acquires the video data generated by the display control device 100. The HUD device 30 includes a projector, a screen, a magnifying optical system, and the like. The HUD device 30 is accommodated in a housing space inside the instrument panel below the windshield WS.

The HUD device 30 projects the light of the display image formed as the virtual image Vi toward the projection range PA of the windshield WS. The light projected toward the windshield WS is reflected toward the driver's seat in the projection area PA and is perceived by the driver. The driver visually recognizes the display image in which the virtual image Vi is superimposed on the superimposition target in the foreground view through the projection range PA.

Figure 2:
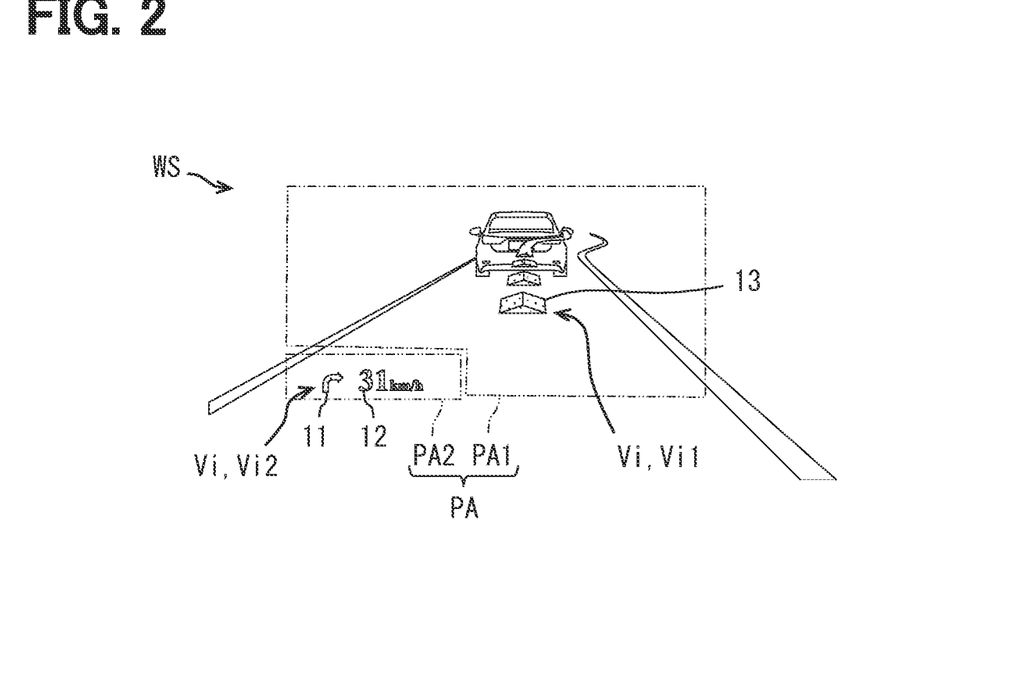
FIG. 2 is a diagram showing an example of information presentation using a distant virtual image and a near virtual image.

The projection range PA on which light is projected by the HUD device 30 is a limited partial area of the entire surface of the windshield WS, and is an area where the virtual image Vi is displayed from the driver's view point. As shown in FIG. 2, the projection range PA includes a near virtual image display area PA2 and a far virtual image display area PA1. The near virtual image display area PA2 is narrower than the far virtual image display area PA1 and is located, for example, in the lower left side or the lower right side of the far virtual image display area PA1. The light projected on the near virtual image display area PA2 is imaged as a near virtual image Vi2. On the other hand, the light projected on the far virtual image display area PA1 is formed as a far virtual image Vi1.

Figure 1:
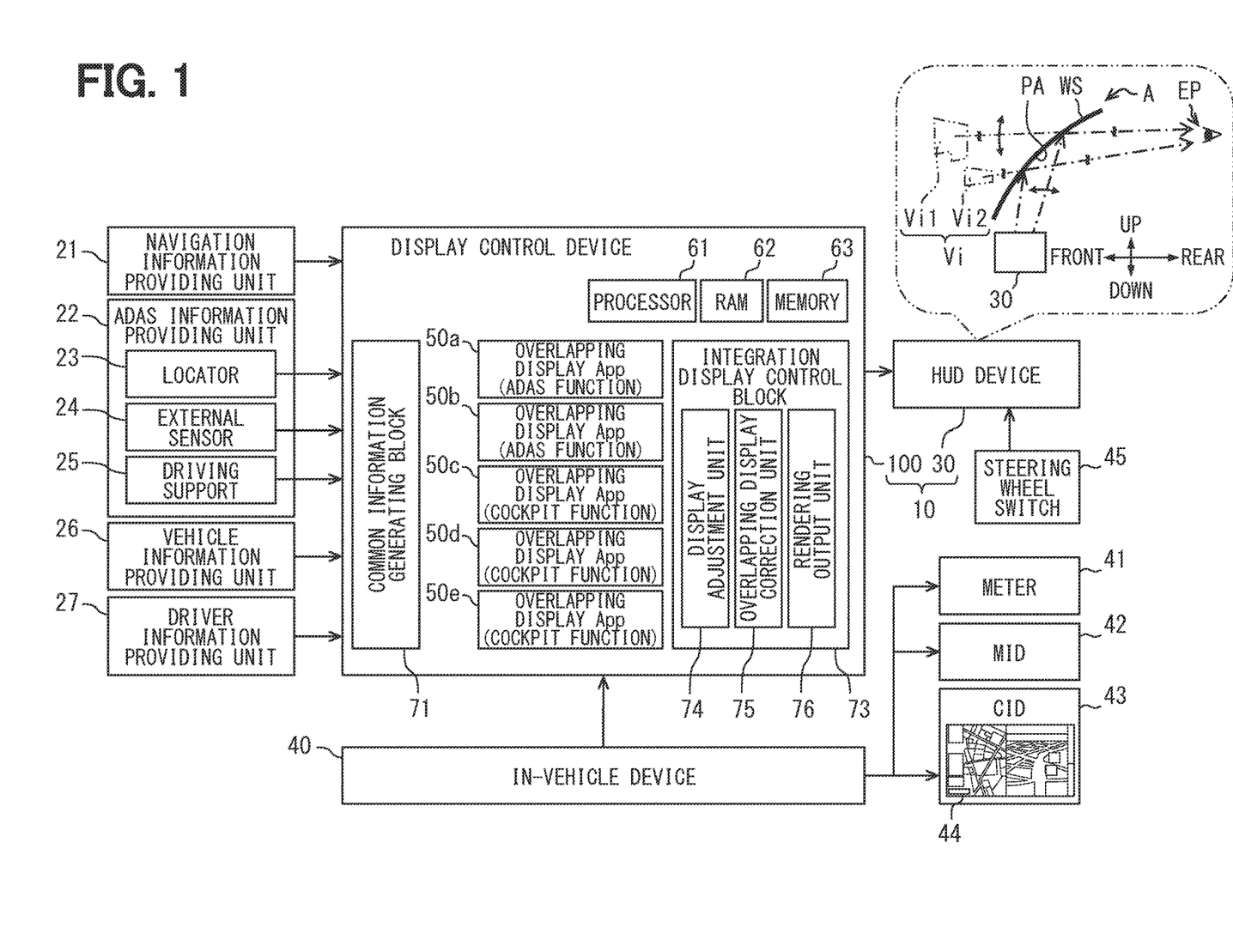
FIG. 1 is a block diagram illustrating an overall image of a in-vehicle configuration related to a virtual image display system.

The near virtual image Vi2 and the far virtual image Vi1 shown in FIGS. 1 and 2 are formed at different positions in the front-rear direction and the up-down direction of the vehicle A, respectively. The near virtual image Vi2 is formed closer to the driver than the far virtual image Vi1, and specifically, is formed in a space of about 2 to 3 meters in the front direction of the vehicle A from the eye point EP of the driver. The near virtual image Vi2 presents the information mainly showing the state of the vehicle A to the driver in the non-AR display manner. As an example, a turn-by-turn icon 11 for instructing the turn left and right and a speed display 12 indicating the vehicle speed is displayed as a near virtual image Vi2.

The far virtual image Vi1 is formed at a position farther from the windshield WS than the near virtual image Vi2, specifically, in a space of about 10 to 20 meters in the front direction of the vehicle A from the eyepoint EP. The far virtual image Vi1 is superposed on a superimposition target (for example, a road surface or a vehicle ahead) in the foreground, so that the AR display is provided. As an example, the AR route 13 or the like indicating the travel route set in the navigation device is displayed as the far virtual image Vi1.

The display control device 100 shown in FIG. 1 is an electronic control unit that controls the display of the virtual image Vi via the HUD device 30. The control circuit of the display control device 100 is mainly configured by a computer having a processor 61, a RAM 62, a memory device 63, and an input/output interface. The processor 61 is configured to include at least one of a CPU (Central Processing Unit) and a GPU (Graphics Processing Unit).

Various programs to be executed by the processor 61 are stored in the memory device 63. In the memory device 63, a plurality of application programs (50a to 50e) for generating AR contents displayed as virtual images, a presentation management program for integrally controlling virtual image display, and the like are stored as display control programs. The display control device 100 has a common information generation block 71 and an integrated display control block 73 as functional blocks based on the presentation management program.

The common information generation block 71 acquires information commonly used by each of the superimposed display applications 50a to 50e and the integrated display control block 73 from the communication bus. Specifically, GNSS reception information, map route information, reroute information, high-accuracy positioning information, external sensing information, driving support control information, vehicle motion information, driver sensing information, control request for superimposition display, and the like are acquired by the common information generation block 71. The common information generation block 71 calculates a parameter required for correction of superimposed display based on the acquired information. In addition, the common information generation block 71 implements abstraction of the acquired information.

The information acquired by the common information generation block 71 includes emergency information with high urgency. For example, among the driving support control information, control information related to the operation of FCW and AEB, control information related to the operation of LKA (i.e., lane departure notification), and the like are preset as emergency information. Further, among the external sensing information, the entry detection information of the lane-changed vehicle immediately before the own vehicle (vehicle A), the detection information of the merged vehicle, and the like are preset as the emergency information.

Based on the information provided by the common information generation block 71, the superimposed display applications 50a to 50e perform the generation of the AR content related to the ADAS function and the cockpit function and the setting of the display flag thereof. Each of the superimposed display applications 50a to 50e is associated with the ACC function, the LKA function and the FCW function of the driving support control system, and the navigation device and the like. Each of the superimposed display applications 50a to 50e individually determines the AR content and the non-AR content to be displayed as a virtual image according to the provided information, and issues a display request to the integrated display control block 73.

The integrated display control block 73 uses the information provided by the common information generation block 71 to generate video data of the far virtual image Vi1 and video data of the near virtual image Vi2 based on the display request from the respective superimposed display applications 50a to 50e. The integrated display control block 73 has a display adjustment unit 74, a superimposed display correction unit 75, and a drawing output unit 76.

The display adjustment unit 74 is a functional unit that adjusts the AR content and the non-AR content displayed as the far virtual image Vi1 and the near virtual image Vi2. The display adjustment unit 74 selects the AR content and the non-AR content with high priority from the acquired display request, and sets them as virtual image display targets. The highest priority is previously assigned to the above-mentioned emergency information. With such a setting, the AR content that notifies the emergency information is virtually always displayed and is displayed promptly.

The display adjustment unit 74 determines whether or not the interruption condition and the restart condition are satisfied based on various information provided from the common information generation block 71, and determines whether to interrupt or restart the AR display using the distant virtual image Vi1. The interruption condition is set in advance so as to be associated with a scene in which accurate superimposition on the superimposition target is difficult, a scene in which AR display is unnecessary, a scene in which AR display interferes with the driver, and the like. Specifically, the interruption condition is preliminarily set such that the vehicle A stops and moves backward, the reliability of the vehicle position information is reduced due to deterioration of the reception situation of the positioning signal, the reroute is performed when the vehicle departs from the planned traveling route, and the driver turns off. On the other hand, the restart condition is determined after the interruption condition is satisfied. The display adjustment unit 74 sets, as the restart condition, the contents associated with the interruption condition that was established immediately before. An exclusion condition and a restriction condition are provided in the above interruption condition and restart condition, respectively. The display adjustment unit 74 does not establish the interruption condition when the exclusion condition is satisfied. Similarly, the display adjustment unit 74 does not establish the restart condition when the restriction condition is satisfied.

The superimposed display correction unit 75 acquires the parameters for superimposition display correction calculated in the common information generation block 71, and generates correction information of the video data of the far virtual image Vi1. The correction information is information for adjusting the imaging position of the far virtual image Vi1 on a virtual line connecting the superimposition target and the eye point EP in a three-dimensional manner so that the far virtual image Vi1 is properly superimposed on the superimposition target. The superimposition display correction unit 75 sequentially generates the correction information in view of considering the relative position of the superimposition target, the position of the eyepoint EP, the vehicle attitude, and the like.

The rendering output unit 76 generates image data obtained by rendering the original image of the content selected by the display adjustment unit 74 for each of the distant virtual image Vi1 and the near virtual image Vi2. The rendering output unit 76 adjusts the drawing position and drawing shape of the original image in each frame, based on the correction information by the superimposition display correction unit 75, for the video data of the far virtual image Vi1. The rendering output unit 76 sequentially outputs the generated video data to the HUD device 30 in a video format defined in advance.

Figure 3:
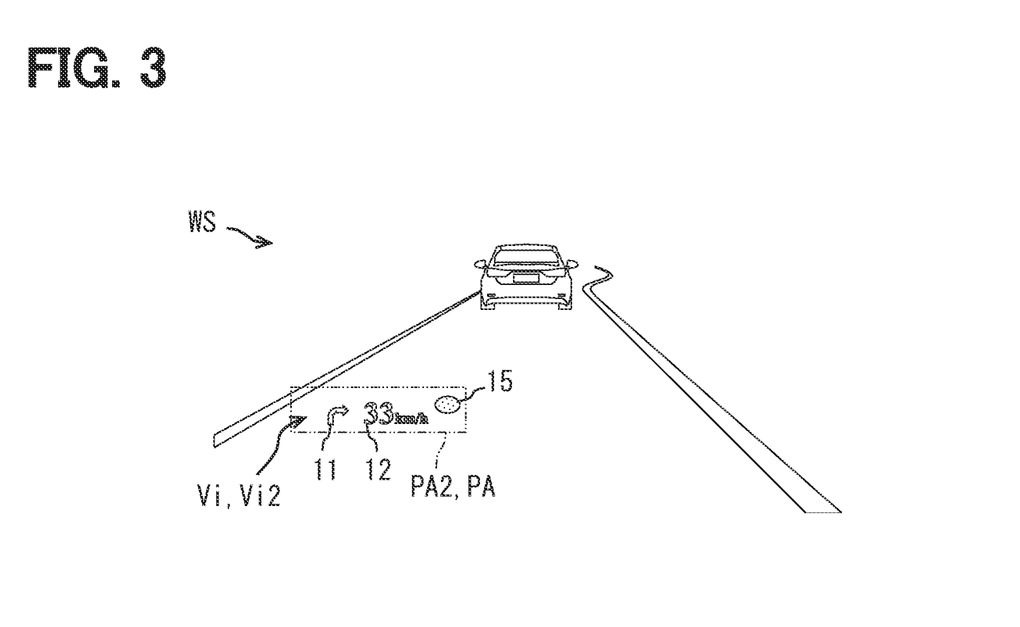
FIG. 3 is a diagram showing a state in which an AR display by a distant virtual image is interrupted based on establishment of an interruption condition.

The rendering output unit 76 suspends the display of the far virtual image Vi1 of the virtual images Vi when the display adjustment unit 74 determines that the suspending condition is satisfied by controlling each video data. On the other hand, the rendering output unit 76 continues to display the near virtual image Vi2. When the display of the distant virtual image Vi1 is suspended, the rendering output unit 76 notifies the driver of the suspension of the display of the distant virtual image Vi1 by the near virtual image Vi2. As an example, the rendering output unit 76 displays the interruption notification icon 15 (see FIG. 3) indicating the interruption of the display of the distant virtual image Vi1 as the near virtual image Vi2. Furthermore, when the display adjustment unit 74 determines that the restart condition is satisfied, the rendering output unit 76 restarts the display of the interrupted far virtual image Vi1.

Even when the rendering output unit 76 suspends the display of the distant virtual image Vi1 based on the satisfaction of the interruption condition, if the common information generation block 71 acquires the emergency information, the rendering output unit 76 outputs and notifies the AR content corresponding to the emergency information as the virtual image Vi1. For example, a lane departure notification on a winding road, an entry notification of a lane change vehicle, a vehicle merging notification, and the like are displayed as virtual images with highly urgent AR contents regardless of the setting of the on/off condition of the AR display.

Next, a plurality of running situations in which the AR display by the distant virtual image Vi1 is interrupted when the interruption condition is satisfied will be specifically described with reference to FIGS. 1 and 2.

<Vehicle Stop Situation>

The integrated display control block 73 determines whether the interruption condition is satisfied when a predetermined time has elapsed during the vehicle stops or after the vehicle stops. For example, when the AR display using the distant virtual image Vi1 is continued at an intersection where a travelling guidance for turning right and left is performed, there is a possibility that the virtual image Vi1 may prevent the driver from visually recognizing the surroundings. In order to avoid such a reduction in the driver's attention, the integrated display control block 73 establishes an interruption condition based on the vehicle stop determination and interrupts the display of the distant virtual image Vi1.

The vehicle stop determination is, for example, that the shift position is a parking "P", that the vehicle speed is zero or less than a certain value, that the traffic signal in front of the vehicle is "red", that the stop line is detected, that the brake lamp of a preceding vehicle in front of the vehicle turns on and/or that the preceding vehicle in front of the vehicle stops. In addition, the vehicle stop determination may be based on, for example, a condition that the vehicle continues stopping for a certain period of time (i.e., X seconds or more). This certain period of time may be changed based on the presence or absence of a preceding vehicle, that is, whether or not the vehicle is a leading vehicle of a group of vehicles stopping at the intersection. For example, when the subject vehicle is the leading vehicle, there is little discomfort in AR display. On the other hand, when the vehicle is not the leading vehicle, the AR display is superimposed on the preceding vehicle, and the driver is likely to feel uncomfortable. Therefore, when the preceding vehicle is detected, the certain period of time used for the vehicle stop determination is adjusted to be shorter than when the preceding vehicle is not detected.

Here, the laws and regulations related to transportation differ depending on the country and region. For example, in the United States, even if the traffic light is red, it is possible to turn right after stopping once. Therefore, the integrated display control block 73 does not establish the interruption condition when the vehicle A is scheduled to turn right even in a case where the nearest traffic light is "red". In this way, the exclusion condition may be set together with the interruption condition. By setting the exclusion condition according to the country and area in which the vehicle A is used, it is possible to avoid the interruption of the display of the distant virtual image Vi1 at an unfavorable timing.

The integrated display control block 73 sets the traveling determination as the restart condition when the vehicle stop determination is the interruption condition. The traveling determination is based on, for example, that the shift position is the drive "D", that the vehicle speed is not zero or is a certain value or more, and the like. According to such setting of the restart condition, for example, in a scene in which there is a large amount of traffic, the vehicle stops at a position away from the intersection to turn left or right, and the remaining distance to the intersection is equal to or more than a certain distance, the AR display of the distant virtual image Vi1 once deleted is restarted at the release timing of the vehicle stop situation.

<Reroute is Planned to Execute>

The integrated display control block 73 determines whether or not the interruption condition is satisfied with the execution of the reroute in the navigation device. For example, when the driver intentionally ignores the route guidance and travels on a route different from the route currently being guided, the AR route 13 displayed as the distant virtual image Vi1 is easily annoyed by the driver and is desirably erased early. Therefore, the integrated display control block 73 performs a re-search execution determination and stops displaying the distant virtual image Vi1 when the re-route execution by the navigation device is estimated. The estimation of reroute implementation (i.e., the determination of re-search implementation) is performed when a sign of deviating from the route indicated by the route information is detected.

Specifically, the integrated display control block 73 recognizes the traveling lane of the vehicle A before the intersection on the basis of the highly accurate position information, and compares it with the left/right turn information indicated by the route information, thereby estimates the movement of the vehicle A at the intersection. Then, when the route predicted from the traveling lane and the route indicated by the route information are different, the integrated display control block 73 estimates the reroute execution. As another example, the integrated display control block 73 can estimate the reroute execution based on the comparison between the operating state of the turn signal and the route indicated by the route information. As described above, the integrated display control block 73 establishes the interruption condition based on the reroute execution estimation, and stops the display of the distant virtual image Vi1 before entering the intersection.

The integrated display control block 73 sets acquisition of new route information searched by the reroute as a restart condition when the reroute execution estimation is set as the interruption condition. According to the setting of the restart condition, the display of the AR route 13 is restarted at the timing when the new route information is acquired from the navigation information providing unit 21. Note that the integrated display control block 73 may use acquisition of map route information for notifying reroute execution as an interruption condition instead of reroute execution estimation.

<Reverse a Car>

The integrated display control block 73 determines whether the interruption condition is satisfied when the vehicle A is moving backward. When the driver reverses the vehicle A, the virtual image display in front is unnecessary. When the shift position is reverse "R", the integrated display control block 73 establishes the interruption condition based on the backward movement determination and stops the display of the distant virtual image Vi1.

The integrated display control block 73 sets the traveling determination as the restart condition similarly to the vehicle stop determination when the backward movement determination is the interruption condition. According to the setting of the restart condition, the display of the distant virtual image Vi1 is restarted at the timing when the normal traveling of the vehicle A is started. Note that, for example, in the vehicle A capable of superimposing display on the rear window, the projection of the virtual image on the rear window may be continued even during the backward movement. According to such control, the driver can visually recognize the virtual image projected on the rear window through the rearview mirror.

<Bad Condition of GNSS Reception Status>

The integrated display control block 73 determines that the interruption condition is satisfied when the positioning signal reception condition is not good. When the positioning signal reception situation is bad and the accuracy of the vehicle position cannot be ensured, the AR route 13 may not be correctly superimposed on the intersection position, especially in urban areas. In order to avoid such a situation, the integrated display control block 73 establishes the interruption condition based on the reception status determination and stops the display of the distant virtual image Vi1. The reception status determination is determined based on the GNSS reception information provided by the navigation information providing unit 21. Specifically, for the low reliability determination, information on the reliability "low" based on a predetermined algorithm is acquired, the number of satellites receiving the positioning signal is less than a certain number, and the positioning signal conditions such as that the signal level is less than a certain value are used. The integrated display control block 73 appropriately combines the plurality of conditions to perform the low reliability determination of the position information due to the bad reception condition.

When the low reliability determination of the position information is used as the interruption condition, the integrated display control block 73 sets the reliability securing determination of the position information due to the recovery of the reception status as the restart condition. The reliability securing determination is performed on the basis that the reliability of the position information is not "low", the number of satellites receiving the positioning signal exceeds a certain number, and the signal level of the positioning signal exceeds a certain value. According to the setting of the restart condition, the AR display using the distant virtual image Vi1 is restarted at the timing when the accuracy of the position information is secured.

Here, when the display of the AR route 13 is suddenly restarted immediately before the intersection (for example, within 100 meters), the driver is urged to immediately respond to the instruction of the AR route 13 and is easily confused. Therefore, the integrated display control block 73 does not establish the restart condition even when the reliability securing determination is performed in a case where the distance to the guidance point such as an intersection is less than a certain value. In this way, the restriction condition can be set together with the restart condition. By setting the restriction condition, the display restart of the distant virtual image Vi1 at an unfavorable timing is avoided.

<Input of Turning-Off Operation>

The integrated display control block 73 determines whether the interruption condition is satisfied when an off operation is input by a vehicle occupant such as a driver. The input target of the off operation is, for example, the steering switch 45 provided on the spoke portion of the steering wheel, the display screen of the CID 43 for displaying the map of the navigation device, or the like. The steering switch 45 is, for example, a push switch. The display screen of the CID 43 displays an enlargement cancel button 44 for ending the display of the intersection enlarged view, for example. The touch operation of pressing the enlargement cancel button 44 is defined as the off operation. The integrated display control block 73 establishes the interruption condition based on the off operation and stops the display of the distant virtual image Vi1.

The integrated display control block 73 sets the on operation as a restart condition. The input target of the on operation is the steering switch 45 as in the off operation. The integrated display control block 73 establishes the restart condition based on the on operation of the steering switch 45 and restarts the display of the distant virtual image Vi1.

The off operation and the on operation, which are the manual inputs as described above, are prioritized over the turning-on control and the turning-off control of the AR display based on the determination of the system side (except in an emergency). For example, when an off operation is input, the integrated display control block 73 erases the display of the AR content that is decided as the turning-on control by the system.

In addition, a temporary off operation and a permanent off operation are set as the off operation. The temporary off operation is, for example, a touch operation of the enlargement cancel button 44, a push-down operation of the steering switch 45, or the like. According to the temporary off operation, for example, the display of the AR route 13 at one guidance intersection is erased, and the display of the AR route 13 at the next guidance intersection is normally performed.

On the other hand, the permanent off operation is an operation of pressing the steering switch 45 twice sequentially, an operation of pressing the steering switch 45 for a long time, or the like. According to the eternally off operation, the AR display using the distant virtual image Vi1 remains in an interruption state until an on operation is input or the display control device 100 is re-activated.

Details of a plurality of processes performed by the display control device 100 to realize the interruption and restart of the AR display described above will be described based on FIGS. 4 to 8 with reference to FIG. 1.

Figure 4:
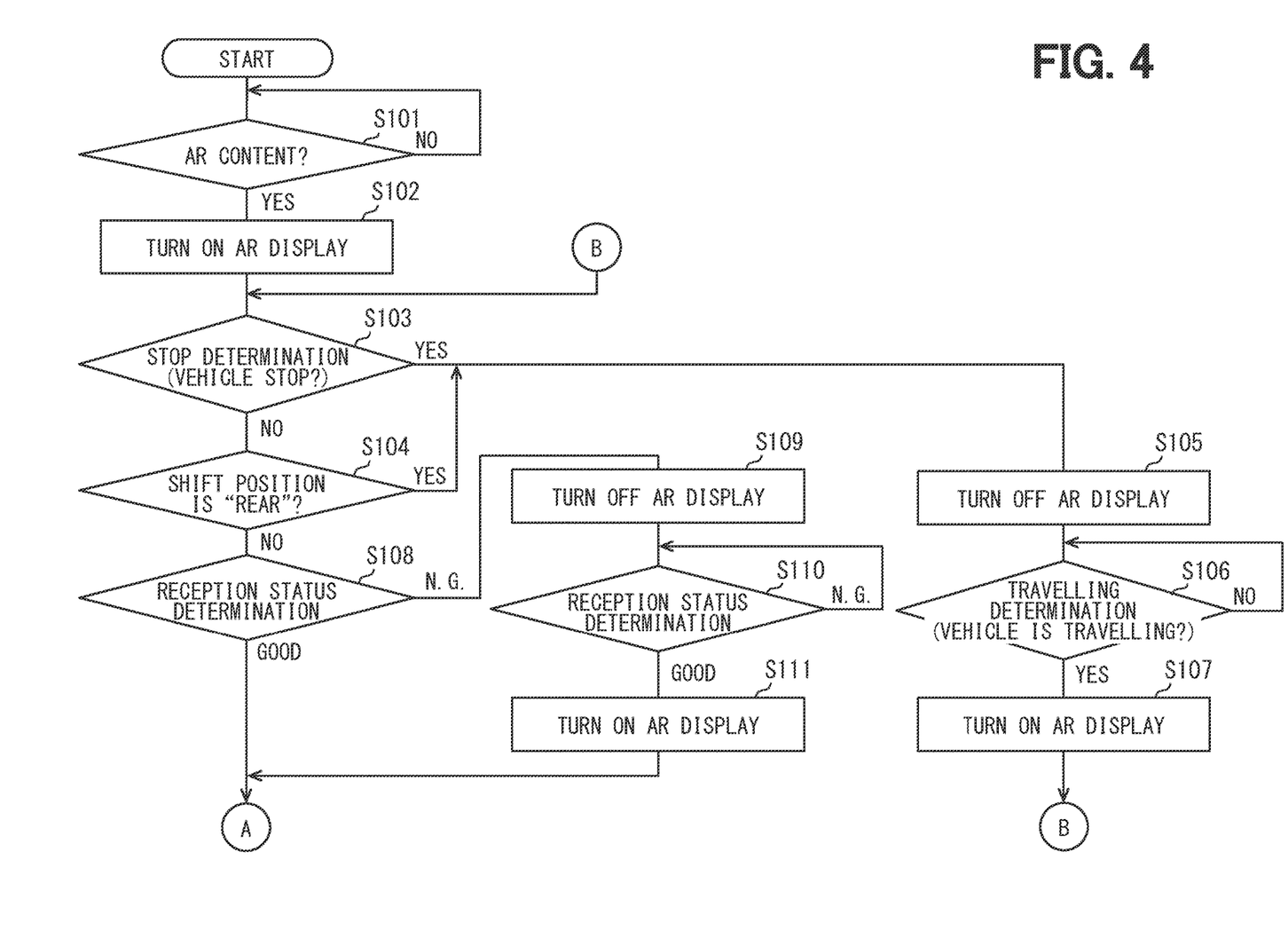
FIG. 4 is a flow chart illustrating details of a display control process performed in a display control device together with FIG. 5.
Figure 5:
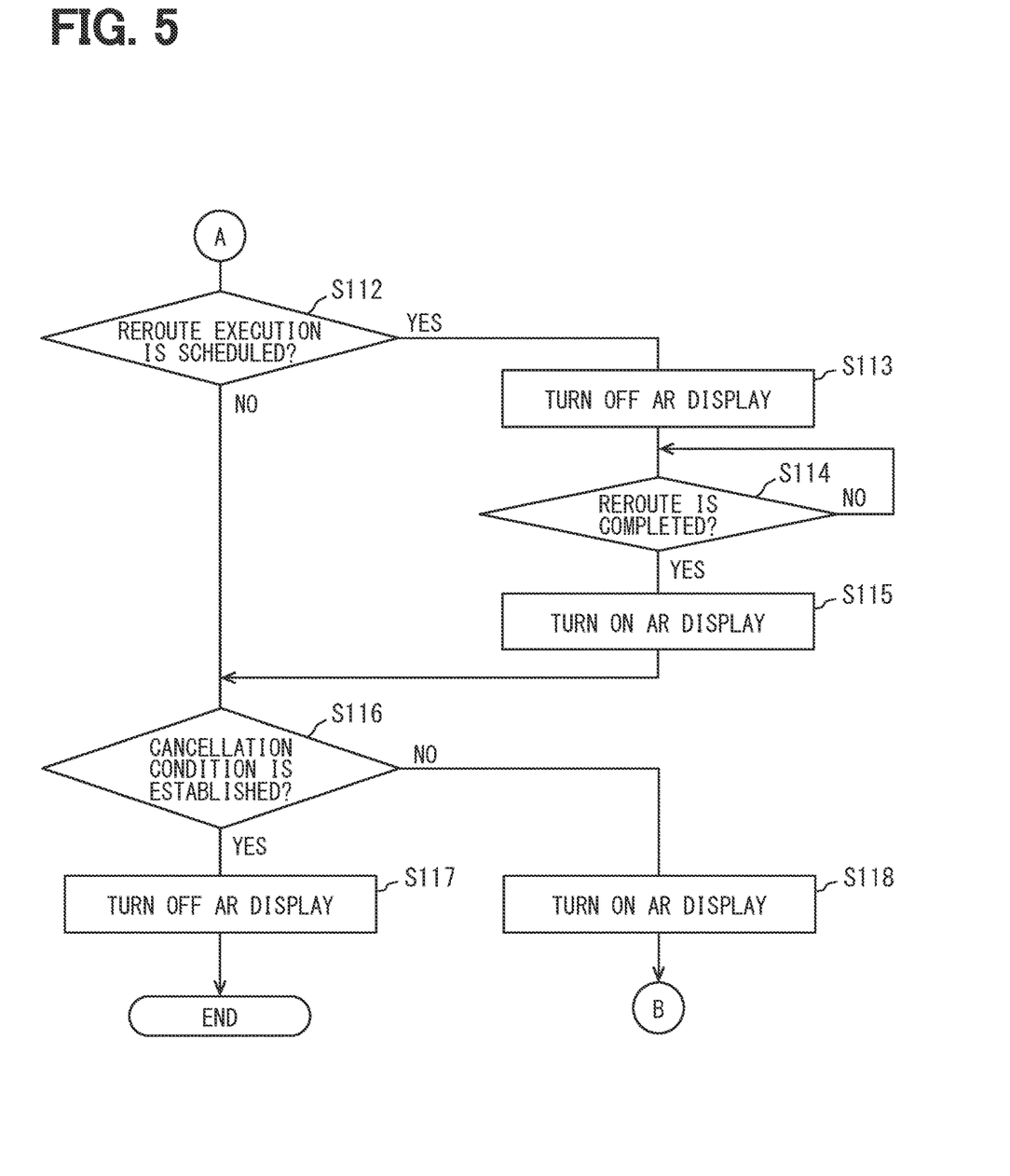
FIG. 5 is a flowchart showing details of display control process together with FIG. 4.

The display control process shown in FIGS. 4 and 5 is started based on, for example, a flag setting of an event occurrence by each of the superimposed display applications 50a to 50e, or the display request by the in-vehicle device 40 in case of approach of the vehicle to an intersection requiring route guidance.

In S101, the presence/absence of AR content to be displayed as the virtual image Vi1 is determined. When it is determined in S101 that there is no AR content, the determination in S101 is repeated. Then, when it is determined in S101 that there is an AR content, the process proceeds to S102. In S102, the AR content is displayed as the distant virtual image Vi1 (and the AR display turns on), and the process proceeds to S103.

In S103, a vehicle stop determination is performed. When it is determined in S103 that the vehicle is stopped, the process proceeds to S105. On the other hand, when it is determined in S103 that the vehicle is not stopped, the process proceeds to S104 and the backward movement determination is performed. When it is determined in S104 that the shift position is "R", the process proceeds to S105.

In S105, the display of the distant virtual image Vi1 started in S102 is interrupted (i.e., the AR display turns off), and the process proceeds to S106. In S106, traveling determination is performed. When it is determined in S106 that the vehicle is not traveling, the traveling determination in S106 is repeated. When it is determined in S106 that the vehicle is traveling, the process proceeds to S107. In S107, the display of the distant virtual image Vi1 interrupted in S105 is restarted (i.e., the AR display turns on), and the process returns to S103.

On the other hand, when it is determined in S104 that the shift position is not "R", the process proceeds to S108. In S108, the reception status of the positioning signal is determined. When it is determined in S108 that the positioning signal reception condition is good, the process proceeds to S112. On the other hand, when it is determined in S108 that the positioning signal reception condition is not good, the process proceeds to S109.

In S109, the display of the distant virtual image Vi1 is interrupted (i.e., the AR display turns off), and the process proceeds to S110. In S110, the reception status determination is performed again. When it is determined in S110 that the reception status of the positioning signal is not recovered, the reception status determination of S110 is repeated. When it is determined in S110 that the reception status has recovered, the process proceeds to S111. In S111, the display of the distant virtual image Vi1 interrupted in S109 is restarted (i.e., the AR display turns on), and the process proceeds to S112.

In S112, the reroute implementation schedule is estimated. In S112, when the reroute execution is not estimated, the process proceeds to S116. On the other hand, When it is estimated in S112 that the reroute will be performed, the process proceeds to S113. In S113, the display of the distant virtual image Vi1 is interrupted (i.e., the AR display turns off), and the process proceeds to S114. In S114, the completion of the reroute execution is awaited, and based on the completion of the reroute, the process proceeds to S115. In S115, the display of the distant virtual image Vi1 interrupted in S113 is restarted (i.e., the AR display turns on), and the process proceeds to S116.

In S116, it is determined whether or not the erasing condition of the distant virtual image Vi1 is satisfied. The erasing condition is a condition that is set in advance, for example, that the vehicle has passed a guidance intersection at which the route guidance is provided or that the remaining distance to the guidance intersection is less than 10 meters. When it is determined that the erasing condition is satisfied in S116, the process proceeds to S117. In S117, the display of the distant virtual image Vi1 is completed (i.e., the AR display turns off), and a series of display control processing ends.

On the other hand, when it is determined in S116 that the erase condition is not satisfied, the process proceeds to S118. In S118, the display of the distant virtual image Vi1 is continued (i.e., the AR display turns on), and the process returns to S103. As described above, the determination of a plurality of types of interruption conditions and restart conditions is repeated until the erasing condition is satisfied, and the start and stop of the AR display are performed depending on the situation.

Figure 6:
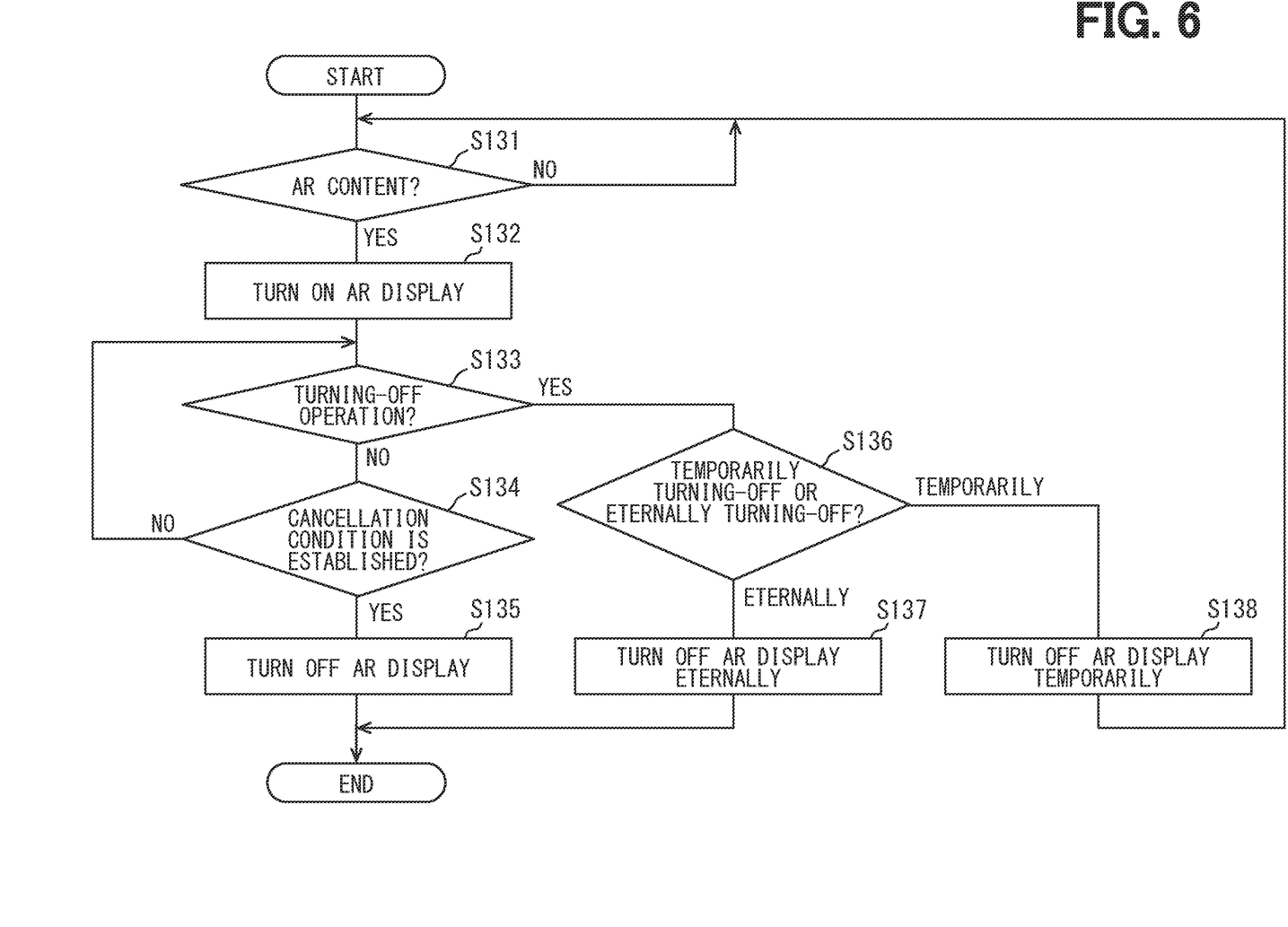
FIG. 6 is a flow chart illustrating details of a turning-off control process performed in a display control device.

The off control process shown in FIG. 6 is started together with the display control process, and is executed concurrently with the display control process. In S131 of the off control process, the presence/absence of AR content displayed as the distant virtual image Vi1 is determined. When it is determined in S131 that there is no AR content, the determination in S131 is repeated. Then, when it is determined in S131 that there is an AR content, the process proceeds to S132. In S132, the AR content is displayed as the distant virtual image Vi1 (and the AR display turns on), and the process proceeds to S133.

In S133, it is determined whether or not the enlargement cancel button 44 or the steering switch 45 has been turned off. When it is determined in S133 that there is no off operation, the process proceeds to S134. In S134, it is determined whether or not the erasing condition is satisfied. When it is determined in S134 that the erasing condition is satisfied, the process proceeds to S135, the display of the distant virtual image Vi1 is completed (i.e., the AR display turns off), and the series of off control processing ends. On the other hand, when it is determined in S134 that the erase condition is not satisfied, the process returns to S133.

When it is determined in S133 that there is off operation, the process proceeds to S136. In S136, the type of off operation is determined. When it is determined in S136 that the permanent off operation has been input, the process proceeds to S137. In S137, the display is switched to the basic setting in which the virtual image Vi1 is not displayed (i.e., the AR display is permanently off), and the off control process ends.

On the other hand, when it is determined in S136 that the temporary off operation is input, the process proceeds to S138. In S138, the distant virtual image Vi1 being displayed is erased (i.e., the AR display is temporarily turned off), and the process returns to S131. As described above, when the signal instructing the display of the AR content is acquired again, the display of the distant virtual image Vi1 is restarted. Note that the implementations of S131, S132, S134, and S135 that overlap with the display control process may be appropriately omitted.

Figure 7:
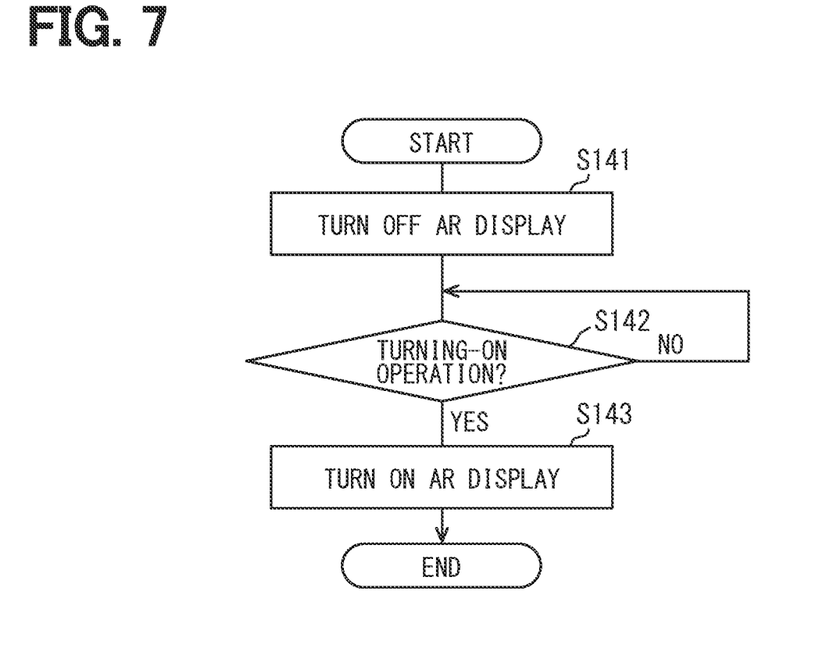
FIG. 7 is a flow chart illustrating details of a turning-on control process performed in a display control device.

The on control process shown in FIG. 7 is started based on the execution of the AR display turning-off by the display control process or the off control process. In S141 of the off control process, the display of the distant virtual image Vi1 is stopped (i.e., the AR display turns off), and the process proceeds to S142. In S142, it is determined whether or not the steering switch 45 is turned on. When it is determined in S143 that there is no turning-on operation, the process of S142 is repeated. When it is determined in S142 that the on operation has been performed, the process proceeds to S143. In S143, the display of the stopped AR content is restarted (i.e., the AR display is turned on), and the on control process ends.

Figure 8:
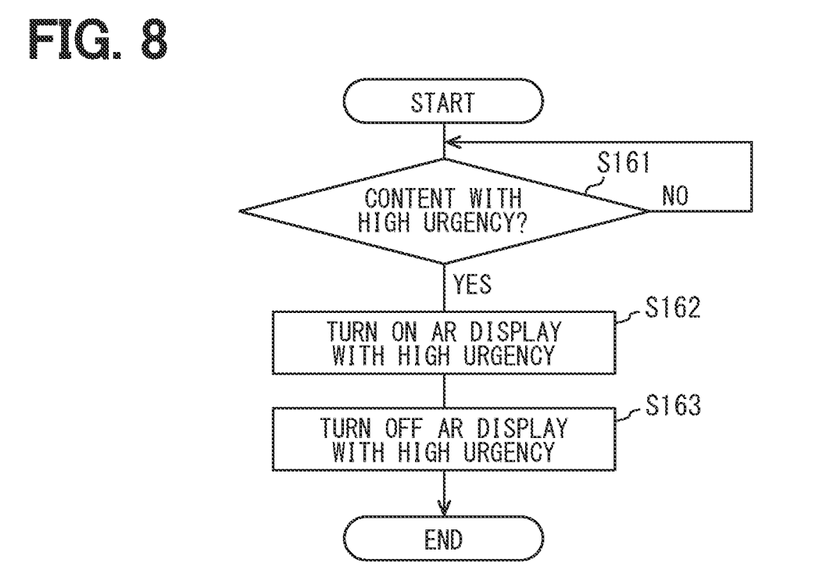
FIG. 8 is a flow chart illustrating details of an emergency display process performed in a display control device.

The emergency display process shown in FIG. 8 is repeatedly executed when the display control device 100 is operating. In S161 of the emergency display process, the presence of AR content having a high degree of urgency is determined to wait for the acquisition of emergency information. Then, in S161, when the emergency information is acquired and it is determined that the AR content with high urgency has occurred, the process proceeds to S162. In S162, the AR content having an urgent degree of "high" is displayed as the far virtual image Vi1 (i.e., the AR display turns on), and the process proceeds to S163. In S163, the display of the AR content started in S162 is completed based on the establishment of a predetermined condition such as a lapse of a certain time from the start of display and passage of an attention point, and the emergency display process ends.

In the present embodiment described thus far, a scene in which the distant virtual image Vi1 cannot be correctly superimposed on the superimposition target can be set as the interruption condition. Therefore, according to the control for interrupting the AR display based on the determination of the satisfaction of the interruption condition, the display of the distant virtual image Vi1 can be suspended in a scene where correct superimposed display is difficult. Therefore, it is possible to display a virtual image that is unlikely to mislead the driver.

In addition, in the present embodiment, the stop condition of the vehicle A, the reverse determination, the deterioration of the reception status of the positioning signal, the execution of the reroute, and the like are used as the interruption condition. The AR display in these scenes lacks accuracy or is unnecessary. Therefore, when these are used as interruption conditions, the driver's discomfort and annoyance with respect to the AR display can be reduced.

Further, in the present embodiment, in a scene in which the driver does not like AR display, the AR display by the distant virtual image Vi1 is stopped by the driver's turning-off operation. Therefore, the driver's discomfort and annoyance caused by the AR display can be further suppressed.

Further, in the present embodiment, after the AR display based on the interruption condition is interrupted, the suspended AR display is restarted based on the satisfaction of the restart condition. With such display control, the information presentation by the AR display using the distant virtual image Vi1 can be appropriately restarted by returning to the situation in which the superimposed display can be correctly performed. According to the above, the display control device 100 can shorten the interruption period of the AR display and perform easy-to-understand information presentation using the AR display in many scenes.

In addition, in this embodiment, the AR display stopped by the driver can be restarted by an turning-on operation based on the driver's judgment. With such a display setting, high usability can be obtained in the AR display using the distant virtual image Vi1.

Further, in the present embodiment, the distant virtual image Vi1 presenting the emergency information is substantially forcibly displayed even when the interruption condition is satisfied. Therefore, highly urgent information can be quickly recognized by the driver. According to the above, even in the display control device 100 that interrupts the AR display based on the system determination and the driver determination, when the emergency information occurs, the advantage of the virtual image display that suppresses the movement of the viewpoint of the driver and increases the information acquisition speed of the driver is obtained and fully demonstrated.

Further, in the present embodiment, even when the AR display by the distant virtual image Vi1 is interrupted due to the establishment of the interruption condition, the non-AR display by the near virtual image Vi2 is continued. Such non-AR display by the near virtual image Vi2 does not require correct superimposition on the superimposition target, and therefore, even if the non-AR display continues to be displayed while the interruption condition is satisfied, it is difficult for the driver to feel discomfort. Then, by continuing to display the near virtual image Vi2, the information such as the vehicle speed is maintained in a state that the driver can easily obtain. Therefore, the display control in which the distant virtual image Vi1 is erased and the near virtual image Vi2 is not erased is suitable for reducing misunderstanding of the driver and ensuring usability of the driver.

In addition, in the present embodiment, the interruption of the AR display using the distant virtual image Vi1 is notified to the driver by the interruption notification icon 15 that is the near virtual image Vi2. Therefore, the intentional interruption of the AR display can be recognized by the driver. Therefore, a situation in which the interruption of the AR display based on the establishment of the interruption condition is mistakenly recognized as the failure of the virtual image display system 10 is avoided.

In the first embodiment, the common information generation block 71 corresponds to the "information acquisition unit", the display adjustment unit 74 corresponds to the "condition determination unit", and the rendering output unit 76 corresponds to the "display control unit".

Other Embodiments

Although one embodiment of the present disclosure has been described above, the present disclosure is not construed as being limited to the above-mentioned embodiments, and can be applied to various embodiments and combinations within a scope that does not depart from the gist of the present disclosure.

In the above embodiment, a plurality of interruption conditions and restart conditions are determined by a series of display control processes (see FIGS. 4 and 5). Alternatively, the display control device may determine whether a plurality of interruption conditions and restart conditions are satisfied, according to individual display control processes (see FIGS. 9 to 12). Alternatively, the display control device may be in the form of determining only one interruption condition and one restart condition.

Figure 9:
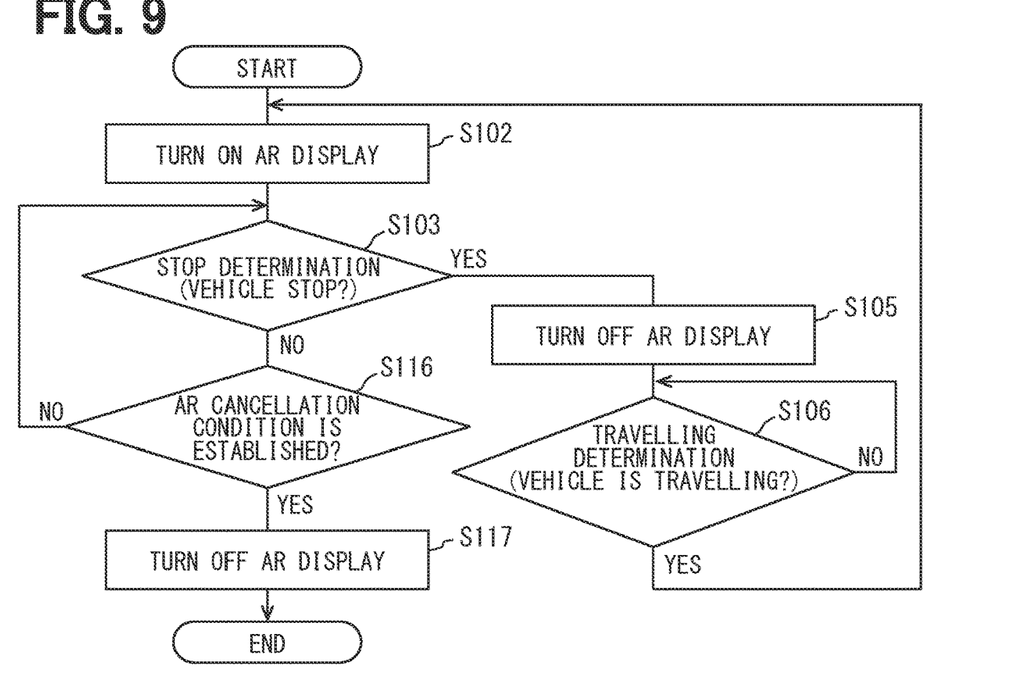
FIG. 9 is a flowchart showing details of a display control process of a modified example 1 in which a vehicle stop determination is used as an interruption condition.

For example, in the first modification of the above embodiment, the display control process shown in FIG. 9 is performed. In the display control process shown in FIG. 9, the vehicle stop determination (at S103) is performed as the interruption condition, and the traveling determination (at S105) is performed as the restart condition. The integrated display control block stops displaying the AR content based on the determination that the vehicle is being stopped, and redisplays the AR content that has been deleted once based on the determination that the vehicle is running.

Figure 10:
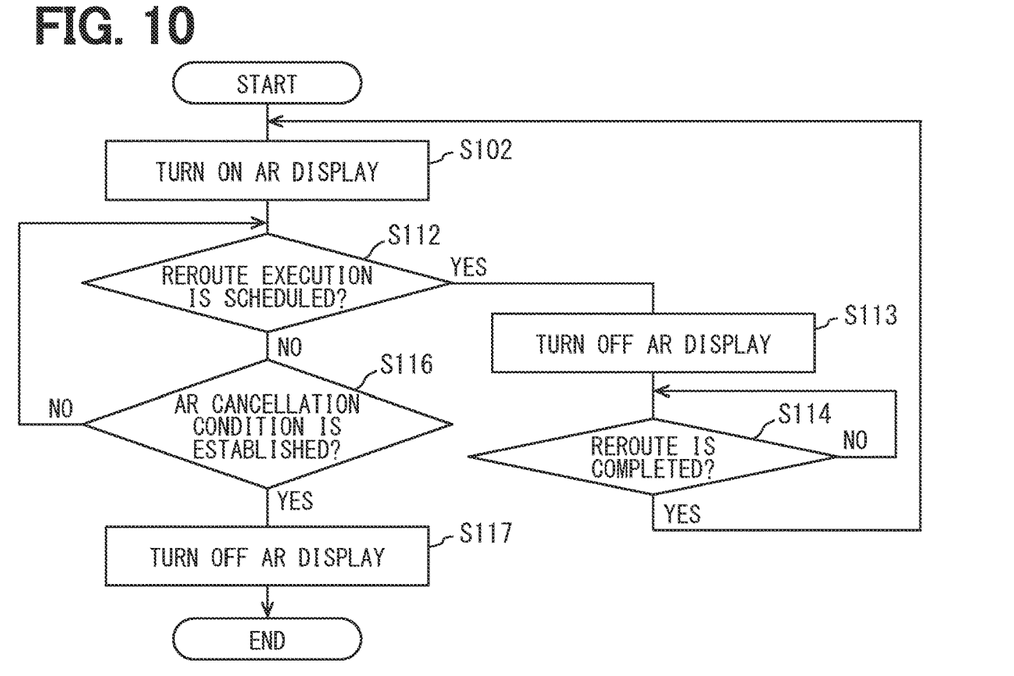
FIG. 10 is a flowchart showing details of a display control process of a modified example 2 in which the determination of re-searching execution of the travel route is used as an interruption condition.

In the second modification, the display control process shown in FIG. 10 is performed. In the display control process shown in FIG. 10, the reroute execution schedule is estimated as the interruption condition (at S112), and the completion of the reroute is determined as the restart condition (at S114). The integrated display control block stops the display of the AR content when the execution of the reroute is estimated, and redisplays the AR content once deleted based on the acquisition of the new route information.

Figure 11:
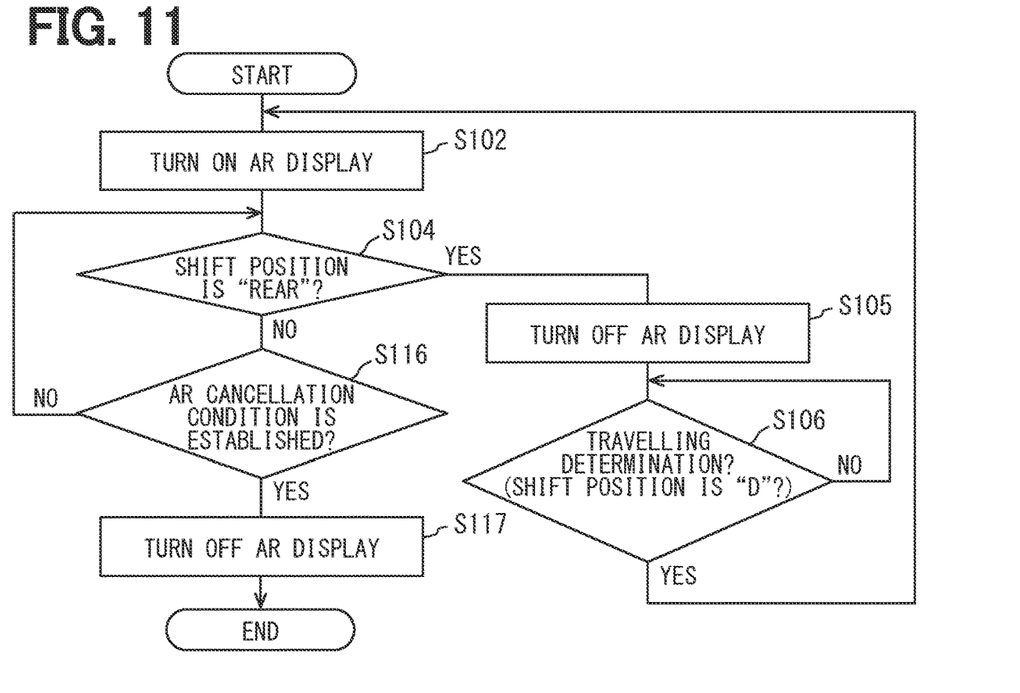
FIG. 11 is a flowchart showing details of a display control process of a modified example 3 in which a back-up determination is used as an interruption condition.

Furthermore, in the third modification, the display control process shown in FIG. 11 is performed. In the display control process shown in FIG. 11, the vehicle reverse determination is performed as the interruption condition (at S104), and the traveling determination (at S106) is performed as the restart condition. The integrated display control block stops displaying the AR content based on the determination that the shift position is "R", and redisplays the AR content that has been deleted once based on the determination that the shift position is "D".

Figure 12:
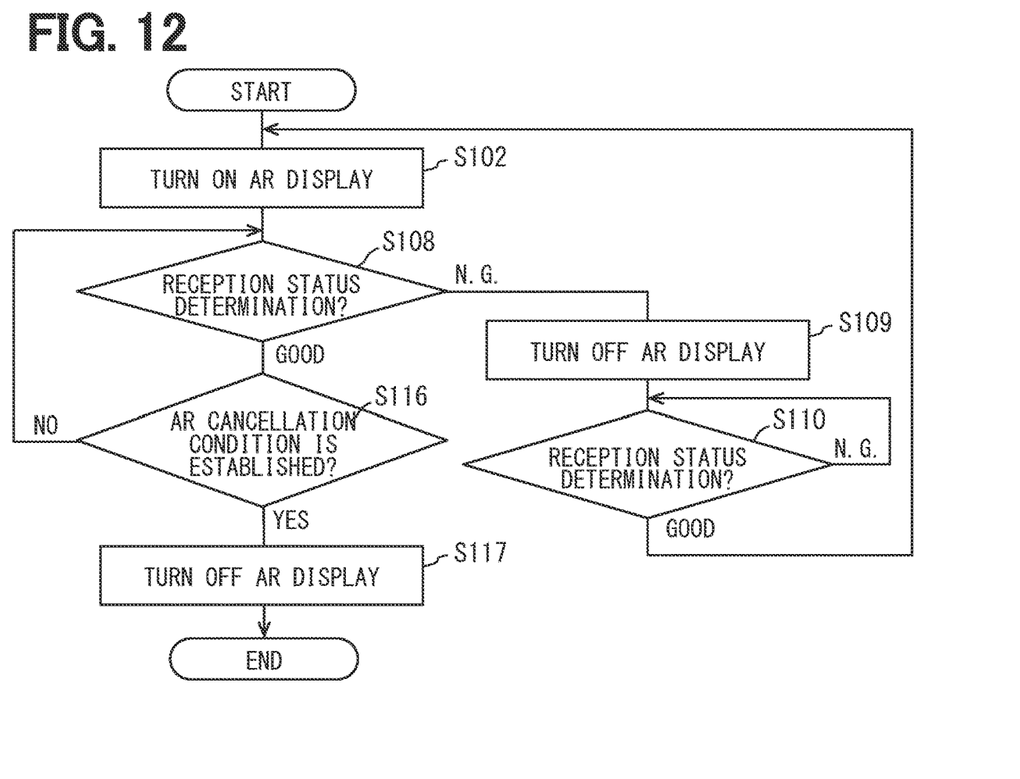
FIG. 12 is a flowchart showing details of a display control process of modification 4 in which a low reliability determination of position information is used as an interruption condition.

In the fourth modification, the display control process shown in FIG. 12 is performed. In the display control process shown in FIG. 12, the reception status of the positioning signal is determined as the interruption condition and the restart condition (at S108 and S110). The integrated display control block stops the display of the AR content based on the deterioration of the reception status, and redisplays the AR content once erased based on the recovery of the reception status.

In the fifth modified example of the above-described embodiment, at least one of the voice recognition function and the gesture recognition function is provided in, for example, an in-vehicle device. The integrated display control block of the display control device can accept an off operation and an on operation by at least one of voice input and gesture input, and performs a display stop operation and a display restart operation of AR content based on the input by voice or gesture.

The HUD device 30 (see FIG. 1) according to the above-described embodiment is a bifocal projection device capable of forming a far virtual image and a near virtual image at completely different positions, respectively. Alternatively, the HUD device of a sixth modification of the above-described embodiment is a single-focus type projection device. More specifically, the image plane of the virtual image light projected by the HUD device according to the sixth modification has a posture inclined toward the front of the vehicle as it goes upward. The virtual image formed in the vicinity of the lower edge of the image plane is a "near virtual image", and non-AR display is performed. On the other hand, the virtual image formed upward from the center of the image plane is defined as a "distant virtual image", and the AR display is performed. In the sixth modification as well, the display of the distant virtual image is interrupted based on the determination that the interrupt condition is satisfied, and the interruption notification icon 15 (see FIG. 3) is displayed as the near virtual image. The shape of the interruption notification icon 15 is not limited to the circular or elliptical emission spot, and may be changed as appropriate.

Further, in the seventh modification of the above-described embodiment, the distant virtual image and the near virtual image are not distinguished from each other. In the seventh modification, based on the determination that the interruption condition is satisfied, the display of the AR virtual image that provides the AR display is interrupted among the plurality of virtual images. On the other hand, the display of the non-AR virtual image for providing the non-AR display is continued. Then, the display interruption of the AR virtual image is notified by the non-AR virtual image.

Further, in the eighth modification of the above-described embodiment, the display of all virtual images is suspended based on the determination that the interruption condition is satisfied. It should be noted that the notification of interruption of the AR display due to the non-AR display or the near virtual image may not be performed. For example, the interruption of the AR display may be performed by the display by the CID 43 or voice message (see FIG. 1).

The steering switch related to the on operation and the off operation may not be the push switch as in the above embodiment. The configuration of the steering switch and the switching logic b of the display setting based on the operation input to the switch may be appropriately changed. For example, by pressing the steering switch, both AR display and non-AR display are turned on, one of AR display and non-AR display is turned off, and both AR display and non-AR display are turned off, and these operations are cyclically switched. According to the above, only the AR display is erased by the operation of pushing the steering switch once, and both the AR display and the non-AR display are erased by the operation of pushing the steering switch further (i.e., twice). Then, by furthermore pressing the staying switch, both the R display and the non-AR display are displayed again.

Further, the steering switch may be configured to have a plurality of switching positions. With such a configuration, by changing the position of the steering switch, both AR display and non-AR display are turned on, one of AR display and non-AR display is turned off, and both AR display and non-AR display are turned off, and these operations are switchable.

In the above embodiment, the far virtual image (i.e., the AR virtual image) that has been once erased is automatically redisplayed based on the determination that the restart condition is satisfied. Alternatively, the restart condition may not be set. Alternatively, the redisplay of the distant virtual image (i.e., the AR virtual image) may not always be performed until the on operation is input.

The AR content that notifies the emergency information is not limited to the information exemplified in the above embodiments. Furthermore, the installation in which the virtual image display of the AR content that notifies the emergency information is not performed may be possible in the integrated display control block.

The optical configuration of the HUD device may be changed as appropriate. For example, the projector may be configured to include a laser light source and a MEMS scanner. For example, the projector may be a DLP (Digital Light Processing, registered trademark) projector using a DMD (Digital Micromirror Device). Further, a projector using LCOS (Liquid Crystal On Silicon) or the like, a liquid crystal projector having a liquid crystal panel and an LED light source, and the like my be adopted for the HUD device.

The display control device of the above embodiment is provided as an electronic control unit separate from the HUD device. Alternatively, each function of the display control device may be mounted in, for example, a control circuit provided in the HUD device, or may be mounted in a control circuit or the like provided in the combination meter.

In the above embodiments, each function provided by the control circuit of the display control device can be provided by software and hardware for executing the software, only software, only hardware, or a complex combination of the hardware and the software. Moreover, if the above functions are provided by an electronic circuit that is hardware, each function may also be provided by a digital circuit which includes multiple logic circuits, or an analog circuit.

Various non-transitory tangible storage media (non-transitory tangible storage medium) such as a flash memory and a hard disk can be employed as the memory device for storing the display control programs. The form of such a storage medium may be appropriately changed. For example, the storage medium may be in the form of a memory card or the like, inserted into a slot portion provided in the display control device, and electrically connected to the control circuit. Further, the storage medium is not limited to the memory device of the in-vehicle device as described above, and may be an optical disk serving as a copy base of the program to the memory device, a hard disk drive of a general-purpose computer, or the like.

The control unit and the method thereof described in the present disclosure are realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

Here, the flowchart described in this application or the process of the flowchart is composed of a plurality of sections (or referred to as steps), and each section is expressed as, for example, S101. Further, each section can be divided into multiple subsections, while multiple sections can be combined into one section. Furthermore, each section thus configured may be referred to as a device, module, or means.

Although the present disclosure has been described in accordance with the examples, it is understood that the present disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

What is claimed is:

1. A display control device for a vehicle controlling a display of an image to a passenger of the vehicle, the display control device comprising:
   a condition determination unit that determines whether a predetermined interruption condition is established, and determines whether a predetermined restart condition is established after the interruption condition is established;
   a display control unit that controls the display of an AR display image and the display of a non-AR display image; and
   an information acquisition unit that acquires predetermined emergency information having high urgency;
   wherein:
   the AR display image is superimposed on a superimposition target disposed in front of the passenger;
   the non-AR display image is not superimposed on the superimposition target;
   the AR display image shows a content corresponding to a content of the non-AR display image;
   the display control unit interrupts the display of the AR display image when the condition determination unit determines that the interruption condition is established;
   the display control unit restarts the display of an interrupted AR display image when the condition determination unit determines that the restart condition is established;
   the display control unit continues the display of the non-AR display image when the condition determination unit determines that at least one of the interruption condition or the restart condition is established;
   the display control unit notifies the passenger of an interruption of the display of the AR display image through the non-AR display image when the display control unit interrupts the display of the AR display image;
   the display control unit notifies the emergency information through the AR display image even when the display of the AR display image is interrupted based on an establishment of the interruption condition in a case where the information acquisition unit acquires the emergency information; and
   the emergency information includes at least one of control information related to operation of a forward collision warning system, control information related to operation of an automatic emergency braking system, control information related to operation of a lane keeping assist system, entry detection information of another lane-changed vehicle immediately before the vehicle, and detection information of another merged vehicle.

2. The display control device according to claim 1, further comprising:
one or more processors; and
a memory coupled to the one or more processors and storing program instructions that when executed by the one or more processors cause the one or more processors to provide at least: the condition determination unit and the display control unit.

3. The display control device according to claim 1, wherein:
the condition determination unit further determines whether a predetermined erase condition of the display of the image is established; and
the display control unit simultaneously erases both the display of the AR display image and the display of the non-AR display image when the condition determination unit determines that the erase condition is established.

4. The display control device according to claim 1, wherein the emergency information includes the control information related to operation of the forward collision warning system.

5. The display control device according to claim 1, wherein the emergency information includes the control information related to operation of an automatic emergency braking system.

6. The display control device according to claim 1, wherein the emergency information includes the control information related to operation of a lane keeping assist system.

7. The display control device according to claim 1, wherein the emergency information includes the entry detection information of another lane-changed vehicle immediately before the vehicle.

8. The display control device according to claim 1, wherein the emergency information includes the detection information of another merged vehicle.

9. A non-transitory tangible computer readable storage medium comprising instructions being executed by a computer, the instructions including a computer-implemented method for a vehicle controlling a display of an image to a passenger of the vehicle, the instructions including:
determining whether a predetermined interruption condition is established;
determining whether a predetermined restart condition is established after the interruption condition is established; and
controlling the display of an AR display image and the display of a non-AR display image;
acquiring predetermined emergency information having high urgency;
interrupting the display of the AR display image when the interruption condition is established;
restarting the display of an interrupted AR display image when the restart condition is established;
continuing the display of the non-AR display image when at least one of the interruption condition or the restart condition is established;
notifying the passenger of an interruption of the display of the AR display image through the non-AR display image in response to the display of the AR display image being interrupted; and
notifying the emergency information through the AR display image even when the display of the AR display image is interrupted based on an establishment of the interruption condition in a case where the information acquisition unit acquires the emergency information;
wherein:
the AR display image is superimposed on a superimposition target disposed in front of the passenger;
the non-AR display image is not superimposed on the superimposition target;
the AR display image shows a content corresponding to a content of the non-AR display image; and
the emergency information includes at least one of control information related to operation of a forward collision warning system, control information related to operation of an automatic emergency braking system, control information related to operation of a lane keeping assist system, entry detection information of another lane-changed vehicle immediately before the vehicle, and detection information of another merged vehicle.

* * * * *